United States Patent
Murakami et al.

(10) Patent No.: US 8,925,383 B2
(45) Date of Patent: Jan. 6, 2015

(54) ANGULAR SPEED SENSOR

(75) Inventors: Hideyuki Murakami, Fukui (JP); Takashi Kawai, Fukui (JP); Kouji Nabetani, Fukui (JP); Takehiko Ogawa, Fukui (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 13/384,694

(22) PCT Filed: Jul. 20, 2010

(86) PCT No.: PCT/JP2010/004646
§ 371 (c)(1),
(2), (4) Date: Jan. 18, 2012

(87) PCT Pub. No.: WO2011/010446
PCT Pub. Date: Jan. 27, 2011

(65) Prior Publication Data
US 2012/0111111 A1    May 10, 2012

(30) Foreign Application Priority Data

Jul. 22, 2009 (JP) ................................ 2009-170939
Oct. 13, 2009 (JP) ................................ 2009-236383

(51) Int. Cl.
*G01C 19/56* (2012.01)
*G01C 19/5614* (2012.01)

(52) U.S. Cl.
CPC .................................. *G01C 19/5614* (2013.01)
USPC ........................................................ 73/504.12

(58) Field of Classification Search
CPC .................................................. G01C 19/5614
USPC ..................................................... 73/504.12
See application file for complete search history.

(56) References Cited

U.S. PATENT DOCUMENTS

| | | | |
|---|---|---|---|
| 5,939,630 | A | 8/1999 | Nozoe et al. |
| 6,089,091 | A | 7/2000 | Nozoe et al. |
| 6,230,562 | B1 | 5/2001 | Ishikawa et al. |

(Continued)

FOREIGN PATENT DOCUMENTS

| | | |
|---|---|---|
| JP | 09-281138 A | 10/1997 |
| JP | 10-073437 | 3/1998 |

(Continued)

OTHER PUBLICATIONS

International Search Report for PCT/JP2010/004646, mailed on Sep. 14, 2010.

*Primary Examiner* — John Chapman, Jr.
(74) *Attorney, Agent, or Firm* — RatnerPrestia

(57) ABSTRACT

An angular velocity sensor includes a vibration body, first and second sensor electrodes generating an electric charge responsive to an angular velocity applied to the vibration body, first and D/A converters each outputting at least two levels of an electric charge, first and second integrator circuits integrating the electric charge generated by the first and second sensor electrodes and the electric charges output from the first and second D/A converters, respectively, a comparator unit comparing output signals from the first and second integrator circuits, first and second D/A switching units switching levels of the output signals from the first and second D/A converters according to a comparison result of the comparator unit, a first disconnection detecting switch connected between the first sensor electrode and the first integrator circuit, a first voltage source for injecting an electric charge into a point between the first sensor electrode and the first integrator circuit via the first disconnection detecting switch, a second disconnection detecting switch connected between the second sensor electrode and the second integrator circuit, and a second voltage source for injecting an electric charge into a point between the second sensor electrode and the second integrator circuit via the second disconnection detecting switch. This angular velocity sensor has a high reliability and performs stable operation even if ambient environment changes.

5 Claims, 13 Drawing Sheets

(56) References Cited

U.S. PATENT DOCUMENTS

| | | |
|---|---|---|
| 6,244,095 B1 | 6/2001 | Nozoe et al. |
| 6,497,146 B1 | 12/2002 | Hobbs et al. |
| 6,912,901 B1 | 7/2005 | Nozoe et al. |
| 2001/0037683 A1 | 11/2001 | Nozoe et al. |
| 2003/0126927 A1 | 7/2003 | Nozoe et al. |
| 2004/0173022 A1 | 9/2004 | Nozoe et al. |
| 2005/0072233 A1 | 4/2005 | Nozoe |
| 2006/0032311 A1 | 2/2006 | Nozoe et al. |
| 2008/0115580 A1 | 5/2008 | Murakami et al. |
| 2010/0013688 A1 | 1/2010 | Murakami et al. |

FOREIGN PATENT DOCUMENTS

| | | |
|---|---|---|
| JP | 2000-146594 A | 5/2000 |
| JP | 2000-146594 A | 5/2000 |
| JP | 2002-174521 A | 6/2002 |
| JP | 2005-114394 A | 4/2005 |
| JP | 2007-529717 A | 10/2007 |
| JP | 2008-128859 A | 6/2008 |
| JP | 2009-020034 A | 1/2009 |
| JP | 2009-20034 A | 1/2009 |
| WO | WO2005/090915 A1 | 9/2005 |
| WO | WO 2005/090915 A1 | 9/2005 |
| WO | WO2008/090747 A1 | 7/2008 |

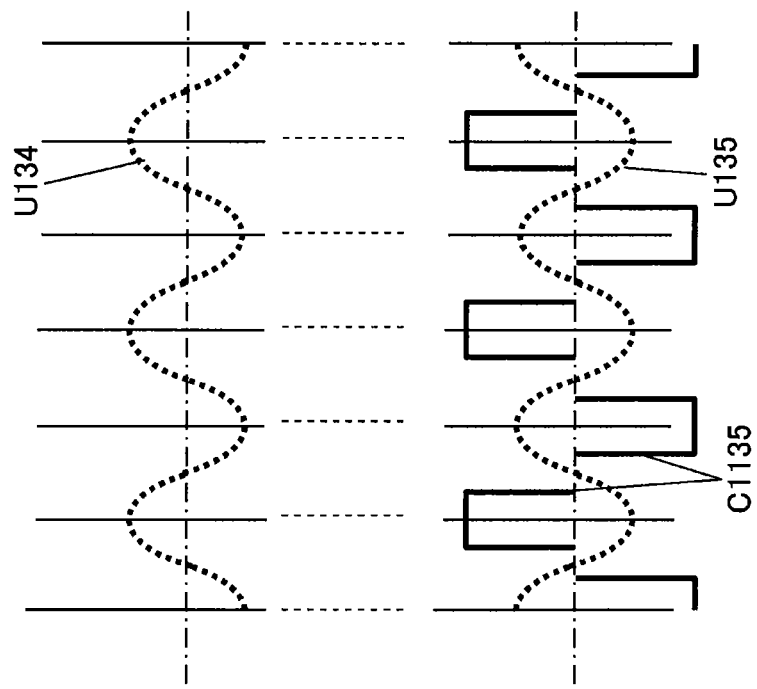
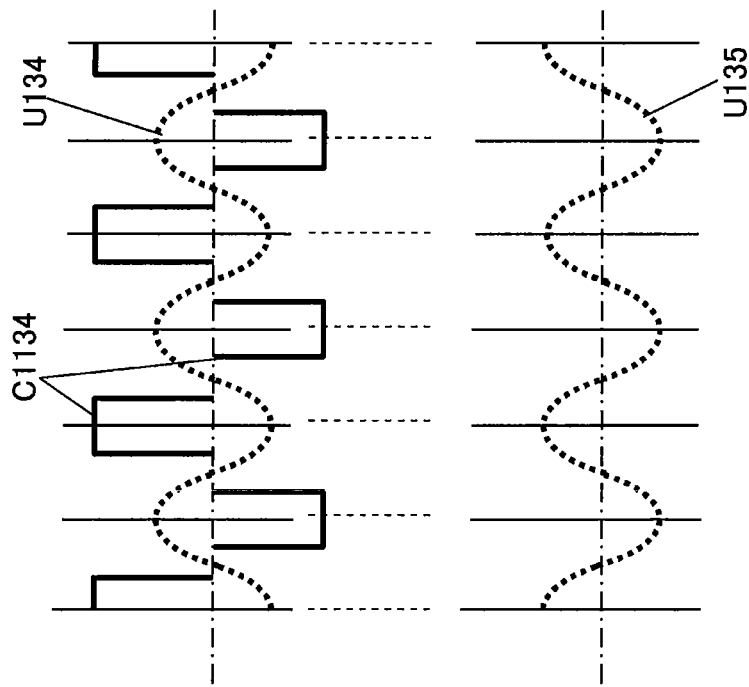

ANGULAR SPEED SENSOR

TECHNICAL FIELD

The present invention relates to an angular velocity sensor used for controlling attitude of a mobile body, such as an aircraft, a vehicle, and a navigation system.

BACKGROUND ART

FIG. 11 is a circuit block diagram of conventional angular velocity sensor 5001 described in Japanese Patent Laid-Open Publication No. 2002-174521. FIG. 12 is a block diagram of driver circuit 6 and failure detector circuit 7 of angular velocity sensor 5001.

Vibrator 1 made of an H-shaped piezoelectric crystal includes a pair of driving arms 2 and a pair of sensing arms 3 provided at the opposite side of the pair of driving arms 2. Sensing arm 3 is provided with a sensor electrode.

One of driving arms 2 is provided with driving electrode 4, and the other one of driving arms 2 is provided with drive detecting electrode 5. Driver circuit 6 is electrically connected to driving electrode 4 and drive detecting electrode 5 of vibrator 1, and controls them to vibrate vibrator 1 with predetermined amplitude. Failure detector circuit 7 includes window comparator 8 and BIT logic circuit 9 for monitoring an output signal of window comparator 8. Detector circuit 10 amplifies an electric charge output from sensing arm 3 of vibrator 1, converts the charge into a voltage, and outputs the voltage as an output signal to the outside from input-output terminal 11.

An operation of conventional angular velocity sensor 5001 will be described below.

When an alternating current (AC) voltage is applied to driving electrode 4 of vibrator 1, vibrator 1 resonates and generates an electric charge corresponding to vibrating amplitude of vibrator 1 in drive detecting electrode 5 of vibrator 1. This electric charge is amplified and adjusted by driver circuit 6, and is input to driving electrode 4 to vibrate vibrator 1 with the predetermined amplitude. When an angular velocity ω is applied to vibrator 1 while vibrating, an electric charge is generated in the sensor electrode provided on the pair of sensing arms 3. The electric charge generated in this sensor electrode is converted into an output voltage by detector circuit 10, supplied through input-output terminal 11, and input as an angular velocity signal to an external device, such as a computer, which in turn determines the angular velocity.

A circuit pattern around the sensor electrode may break during an extended period of use In this case, conventional angular velocity sensor 5001 outputs a signal which does not correspond to the angular velocity.

FIGS. 13 and 14 are a side view and sectional views of another conventional angular velocity sensor 5002 disclosed in Japanese Patent Laid-Open Publication No. 10-73437. FIG. 15 is a circuit block diagram of angular velocity sensor 5002.

Vibrator 101 made of a piezoelectric mono-crystal includes vibration body 102, vibration body 103 in juxtaposition with vibration body 102, and connecting arm 104 connecting between vibration bodies 102 and 103. Vibration body 102 is provided with four driving electrodes 105. Vibration body 103 is also provided with two detecting electrodes 106. Drive detector circuit 107 includes power supply 108, offset adjusting circuit 109, driver circuit 110, synchronous detector circuit 111, and differential amplifier circuit 112.

An operation of conventional angular velocity sensor 5002 will be described below.

When an alternating current (AC) voltage is applied from driver circuit 110 to driving electrodes 105 of vibration body 102, vibrator 101 vibrates due to resonance, and the vibration is transmitted to second vibration body 103 via connecting arm 104. When an angular velocity is applied to vibrator 101 while vibrating, detecting electrodes 106 provided on vibration body 103 generate an output signal corresponding to the angular velocity. This output signal is supplied to synchronous detector circuit 111 through a phase adjusting circuit. Synchronous detector circuit 111 performs synchronous detection on this output signal by using the driving signal output from driver circuit 110 as a reference signal, and supplies it to differential amplifier circuit 112 via a smoothing circuit. Offset adjusting circuit 109 receives a voltage from power supply 108, and outputs an offset voltage. Differential amplifier circuit 112 amplifies a difference between the offset voltage and the voltage output from the smoothing circuit, and produces two outputs 191 and 192. A difference in the potential between outputs 191 and 192 is used to detect the angular velocity.

FIG. 16 illustrates waveforms of the driving signal applied to driving electrodes 105 and a detected signal output from detecting electrodes 106. Detecting electrodes 106 generate an undesired signal even when no angular velocity is applied to vibrator 101 if there is a mechanically induced leakage due to unbalanced mass of vibrator 101 or an electro-mechanically coupled leakage attributed to a positional deviation of any of driving electrodes 105 and detecting electrodes 106. More specifically, the detected signal contains electrostatic leakage L101 due to electrostatic capacitances among driving electrodes 105 and detecting electrodes 106, and aggregate leakage L102 resulting from combination of the mechanically induced leakage and the electro-mechanically coupled leakage discussed above.

FIGS. 17A and 17B illustrate a cross-sectional view and a side view respectively of vibrator 101. In conventional angular velocity sensor 5002, a bottom portion of vibration body 103 is trimmed in order to reduce the mechanically induced leakage and the electro-mechanically coupled leakage of vibrator 101. This changes the mass balance of vibrator 101 to eliminate the undesired signal generated by angular velocity sensor 5002.

When vibrator 101 has a small size according to a small size of angular velocity sensor 5002, vibrator 101 tends to damage in the process of trimming the bottom portion of vibration body 103, and this makes it not feasible to eliminate the undesired signal generated from angular velocity sensor 5002.

CITATION LIST

Patent Literature

PATENT LITERATURE 1: Japanese Patent Laid-Open Publication No. 2002-174521
PATENT LITERATURE 2: Japanese Patent Laid-Open Publication No. 10-73437

SUMMARY OF THE INVENTION

An angular velocity sensor includes a vibration, first and second sensor electrodes generating an electric charge responsive to an angular velocity applied to the vibration body, first and D/A converters each outputting at least two levels of an electric charge, first and second integrator circuits integrating the electric charge generated by the first and second sensor electrodes and the electric charges output from the first and second D/A converters, respectively, a comparator unit comparing output signals from the first and second integrator circuits, first and second D/A switching units switching levels of the output signals from the first and second D/A converters according to a comparison result of the comparator unit, a first disconnection detecting switch connected between the first sensor electrode and the first integrator circuit, a first voltage source for injecting an electric charge into a point between the first sensor electrode and the first integrator circuit via the first disconnection detecting switch, a second disconnection detecting switch connected between the second sensor electrode and the second integrator circuit, and a second voltage source for injecting an electric charge into a point between the second sensor electrode and the second integrator circuit via the second disconnection detecting switch.

This angular velocity sensor has a high reliability and performs stable operation even if ambient environment changes.

BRIEF DESCRIPTION OF DRAWINGS

FIG. 8A illustrates other cancellation signals of the angular velocity sensor according to Embodiment 2.

FIG. 8B illustrates further cancellation signals of the angular velocity sensor according to Embodiment 1.

DETAIL DESCRIPTION OF PREFERRED EMBODIMENTS

Exemplary Embodiment 1

Figure 1:
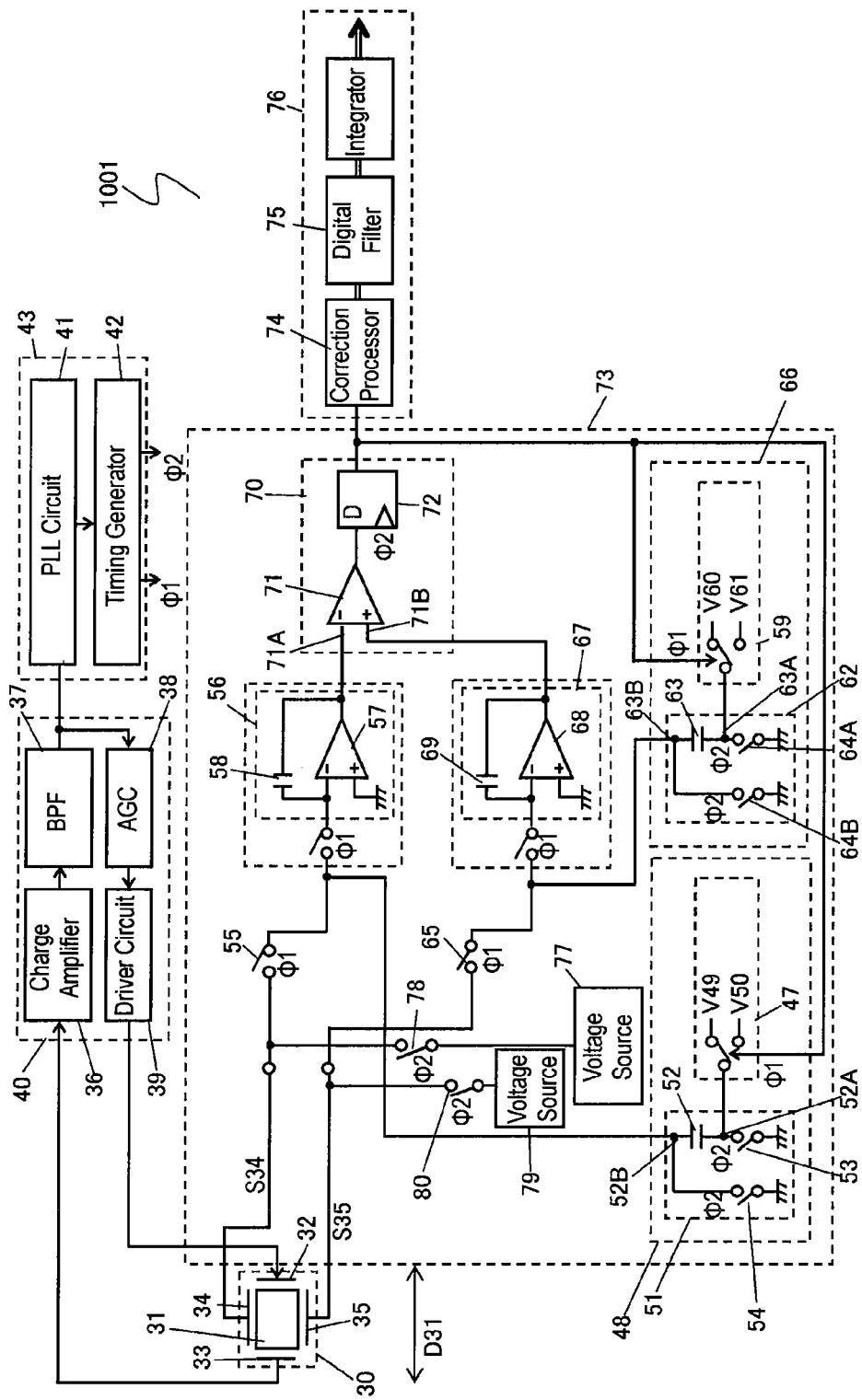
FIG. 1 is a circuit diagram of an angular velocity sensor according to Exemplary Embodiment 1 of the present invention.

FIG. 1 is a circuit diagram of angular velocity sensor 1001 according to Exemplary Embodiment 1 of the present invention.

Sensor element 30 includes vibration body 31, driving electrode 32 including a piezoelectric element for vibrating vibration body 31, monitor electrode 33 having a piezoelectric element for generating an electric charge responsive to a vibration of vibration body 31, and sensor electrodes 34 and 35 having a piezoelectric element for generating electric charges when an angular velocity is applied to sensor element 30. Sensor electrodes 34 and 35 generate the electric charges having polarities opposite to each other. Charge amplifier 36 amplifies the electric charge output from monitor electrode 33 to a level of predetermined amplitude, and converts the amplified converted electric charge into a voltage. Band-pass filter (BPF) 37 outputs a monitor signal after removing a noise component from the voltage output from charge amplifier 36. Automatic gain control (AGC) circuit 38 includes a half-wave rectifier and a smoothing circuit, and generates a direct current (DC) voltage by performing half-wave rectification and smoothing to the voltage output from band-pass filter 37. Based on this DC voltage, AGC circuit 38 either amplifies or attenuates the voltage output from band-pass filter 37 and outputs it. Driving circuit 39 outputs a driving signal to driving electrode 32 of sensor element 30 based on the voltage output from AGC circuit 38. Charge amplifier 36, band-pass filter 37, AGC circuit 38 and driving circuit 39 constitute driver circuit 40.

PLL circuit 41 multiplies a frequency of the voltage output from band-pass filter 37 of driver circuit 40, time-integrates and reduces a phase noise of the voltage, and outputs the resulting voltage. Timing generator circuit 42 multiplies a frequency of the voltage output from PLL circuit 41, generates and outputs timing signals Φ1 and Φ2. PLL circuit 41 and timing generator circuit 42 constitute timing control circuit 43.

Figure 2:
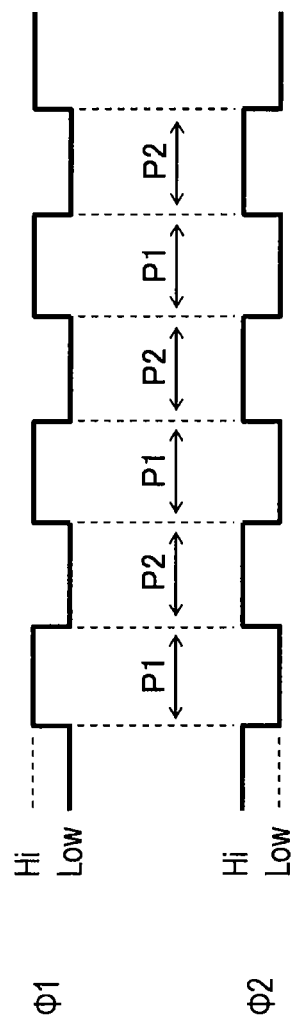
FIG. 2 illustrates waveforms of timing signals of the angular velocity sensor according to Embodiment 1.

FIG. 2 illustrates waveforms of timing signals Φ1 and Φ2. Timing signals Φ1 and Φ2 has polarities opposite to each other. Each of the timing signals has two levels; a high level and a low level. Timing signal Φ2 is at the high level and timing signal Φ1 is at the low level during a period of P2.

On the other hand, timing signal Φ2 is at the low level and timing signal Φ1 is at the high level during a period of P1. Timing signals Φ1 and Φ2 define the periods of P1 and P2 alternately and continuously.

D/A switching unit 47 switches and selectively outputs reference voltages V49 and V50 in response to a predetermined signal. D/A output unit 51 includes capacitor 52, switch 54 connected between one terminal 52B of capacitor 52 and a ground, and switch 53 connected between the other terminal 52A of capacitor 52 and the ground. The voltage output from D/A switching unit 47 is input to terminal 52A of capacitor 52. Switches 53 and 54 are turned on in the period P2 to discharge an electric charge of capacitor 52. D/A switching unit 47 and D/A output unit 51 constitute D/A converter 48. D/A converter 48 discharges the electric charge of capacitor 52 and inputs and outputs an electric charge corresponding to the reference voltage output from D/A switching unit 47 during the period P1. Switch 55 outputs an output signal as a current supplied from sensor electrode 34 during the period P1. The signal output from switch 55 is input to integrator circuit 56. Integrator circuit 56 includes operational amplifier 57 and capacitor 58 connected between an output terminal and an inverting input terminal of operational amplifier 57.

D/A switching unit 59 switches and selectively outputs reference voltages V60 and V61 in response to a predetermined signal. D/A output unit 62 includes capacitor 63, switch 64A connected between one terminal 63A of capacitor 63 and the ground, and switch 64B connected between the other terminal 63B of capacitor 63 and the ground. The voltage output from D/A switching unit 59 is input to terminal 63A of capacitor 63. Switches 64A and 64B are turned on during the period P2 to discharge an electric charge of capacitor 63. D/A switching unit 59 and D/A output unit 62 constitute D/A converter 66. D/A converter 66 discharges the electric charge of capacitor 63 and inputs and outputs an electric charge corresponding to the reference voltage output from D/A switching unit 59 during the period P2. Switch 65 outputs an output signal as a current supplied from sensor electrode 35 during the period P1. The signal output from switch 65 is input to integrator circuit 67. Integrator circuit 67 includes operational amplifier 68 and capacitor 69 connected between an output terminal and an inverting input terminal of operational amplifier 68.

Comparator unit 70 includes comparator 71 and D-type flip-flop 72. Comparator 71 compares a signal output by integrator circuit 56 with a signal output from integrator circuit 67, and outputs a one-bit digital signal consisting of one bit to D-type flip-flop 72. D-type flip-flop 72 latches the one-bit digital signal at the beginning of period P1 and outputs a latching signal. The latched signal is input to D/A switching unit 47 in D/A converter 48. D/A converter 48 switches reference voltages V49 and V50. The latched signal is also input to D/A switching unit 59 of D/A converter 66. D/A converter 66 switches reference voltages V60 and V61. D/A converters 48 and 66, integrator circuits 56 and 67, and comparator unit 70 constitute $\Sigma\Delta$ modulator 73. $\Sigma\Delta$ modulator 73 performs a $\Sigma\Delta$ modulation to the electric charges output from each of sensor electrodes 34 and 35 of sensor element 30 to convert the charge into a one-bit digital signal.

Correction processor 74 receives the one-bit digital signal output from flip-flop 72, and performs a corrective operation to the one-bit digital signal by a substitution process with a predetermined correction factor. When correction processor 74 receives one-bit digital signals of values "0", "1" and "−1", correction processor 74 substitutes the signals with multi-bit digital signals of values "0", "5" and "−5", respectively in the case that the correction factor is "5". The digital signals output from correction processor 74 are input to digital filter 75 that filters the signals to remove noise components of the signals. Correction processor 74 and digital filter 75 constitute operation unit 76. Operation unit 76 latches the one-bit digital signals according to the timing signal $\Phi 1$, performs the corrective operation, and filters the signals to output multi-bit digital signals. Timing control circuit 43, $\Sigma\Delta$ modulator 73, and operation unit 76 constitute a sensor circuit. Voltage source 77 supplies an electric charge corresponding to value "2" to a point between sensor electrode 34 and integrator circuit 56 via disconnection detecting switch 78. Voltage source 79 supplies another electric charge corresponding to value "−2" to a point between sensor electrode 35 and integrator circuit 67 via disconnection detecting switch 80. In other words, the electric charges supplied from voltage sources 77 and 79 have absolute values substantially equal to each other and have polarities opposite to each other.

Figure 3:
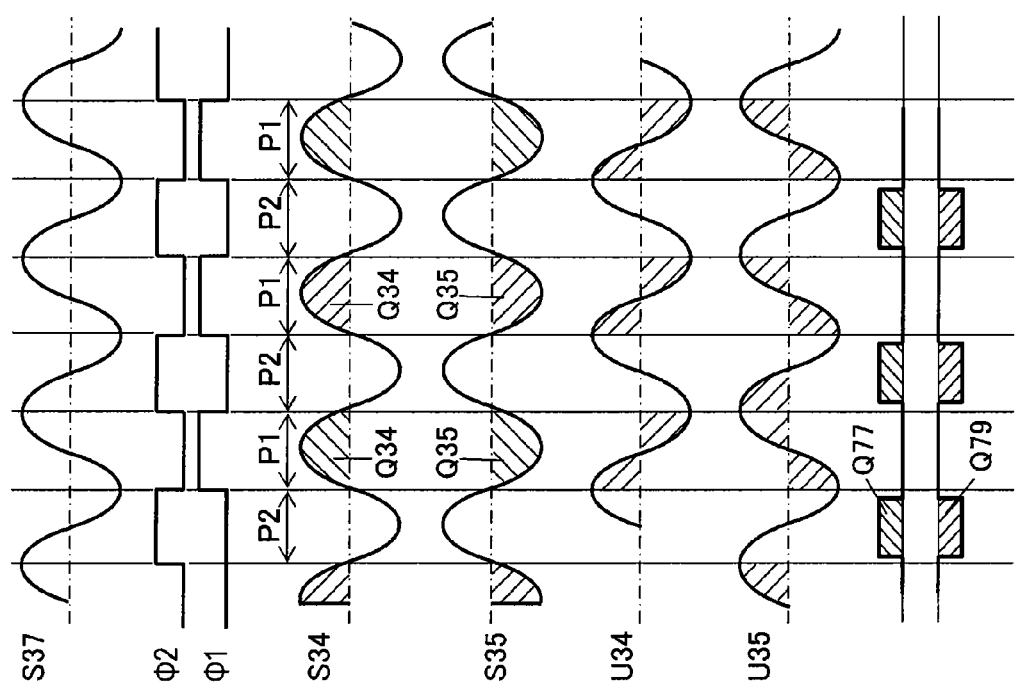
FIG. 3 illustrates signals of the angular velocity sensor according to Embodiment 1.

An operation of angular velocity sensor 1001 according to Embodiment 1 will be described below. FIG. 3 illustrates waveforms of signals of angular velocity sensor 1001.

When an alternating voltage is applied to driving electrode 32 of sensor element 30, vibration body 31 vibrates with a resonant frequency and generates an electric charge in monitor electrode 33. The electric charge generated in monitor electrode 33 is input to charge amplifier 36 of driver circuit 40. The charge amplifier 36 converts the electric charge into an output voltage of a sinusoidal wave. Band-pass filter 37 removes noise components and extracts only a resonant frequency component of vibration body 31 from the output voltage of charge amplifier 36, and outputs signal S37 having a sinusoidal waveform shown in FIG. 3. AGC circuit 38 including a half-wave rectification and smoothing circuit converts signal S37 into a direct current (DC) signal. When this DC signal has a large amplitude, AGC circuit 38 sends a signal to driving circuit 39 to have the output signal of band-pass filter 37 attenuate. AGC circuit 38 sends a signal to driving circuit 39 to amplify the output signal of band-pass filter 37 when the DC signal has a small amplitude. Driving circuit 39 is controlled to cause vibration body 31 to vibrate with a constant amplitude. In timing control circuit 43, PLL circuit 41 generates a signal by multiplying a frequency of signal S37. Based on this signal timing, generator circuit 42 generates timing signals $\Phi 1$ and $\Phi 2$ shown in FIGS. 2 and 3. Timing signals $\Phi 1$ and $\Phi 2$ are input to $\Sigma\Delta$ modulator 73 and correction processor 74, to determine switching timing of the switches and latching timing of a latching circuit.

When sensor element 30 having a mass m rotates about the center axis in a longitudinal direction of vibration body 31 at angular velocity $\omega$ while vibrating flexibly by an electric charge corresponding to velocity V in a driving direction D31 shown in FIG. 1, sensor element 30 produces Coriolis force F expressed as follows.

$F = 2 \times m \times V \times \omega$

Coriolis force F generates signals S34 and S35 of electric currents shown in FIG. 3 in sensor electrodes 34 and 35, respectively. Since signals S34 and S35 are generated by Coriolis force F, signals S34 and S35 have sinusoidal waveforms with phases shifted by 90 degrees from signal S37 generated in monitor electrode 33. As shown in FIG. 3, signals S34 and S35 are sinusoidal waves of phases opposite to each other, and in the relationship of positive polarity signal and negative polarity signal.

An operation of $\Sigma\Delta$ modulator 73 in this case will be described below. Timing signals $\Phi 1$ and $\Phi 2$ define periods P1 and P2 that repeat continuously and alternatively. $\Sigma\Delta$ modulator 73 $\Sigma\Delta$ modulates signals S34 and S35 output from sensor electrodes 34 and 35 according to timing signals $\Phi 1$ and $\Phi 2$, and converts signals S34 and S35 into one-bit digital signals.

An operation of $\Sigma\Delta$ modulator 73 during periods P1 and P2 will be described below. For example, in the following explanation, a predetermined angular velocity is applied to sensor element 30 to rotate sensor element 30 about the center axis thereof so that signals S34 and S35 having a maximum current corresponding to a value "8" are generated by sensor electrodes 34 and 35, respectively.

Switch 55 is turned on in period P1, and a voltage provided by the electric charge corresponding to the value "8" generated in sensor electrode 34 is retained in capacitor 58 of integrator circuit 56. This voltage of the electric charge retained in capacitor 58 is input to inverting input terminal 71A of comparator 71 of comparator unit 70. Similarly, the voltage provided by the electric charge corresponding to the value "−8" generated in sensor electrode 35 is retained in capacitor 69 of integrator circuit 67. This voltage of the electric charge retained in capacitor 69 is input to non-inverting input terminal 71B of comparator 71. Consequently, one-bit digital signal "1" produced by comparator 71 as a comparison result is input to flip-flop 72, and is latched by flip-flop 72 at the beginning of period P2. Switches 53 and 54 of D/A output unit 51 are turned on in period P2, and discharge the electric charge retained in capacitor 52. Similarly, switches 64A and 64B of D/A output unit 62 are turned on in period P2, and discharge the electric charge retained in capacitor 63. The digital signal "1" latched in flip-flop 72 is input to D/A switching unit 47 of D/A converter 48 in the next period P1, and is switched to reference voltage V50 that generates an electric charge corresponding to value "−10". Similarly, the digital signal "1" latched in flip-flop 72 is input to D/A switching unit 59 of D/A converter 66 in the next period P1, and is switched to the reference voltage V60 that generates an electric charge corresponding to value "10". As a result, an electric charge equivalent to the electric charge corresponding to the value "−10" from reference voltage V50 is stored in capacitor 52 of D/A output unit 51, and is input to integrator circuit 56. Simultaneously, an electric charge equivalent to the electric charge corresponding to the value "10" from reference voltage V60 is stored in capacitor 63 of D/A output unit 62, and is input to integrator circuit 67. In this same period P1, switch 55 is turned on and outputs, to integrator circuit 56, an electric charge equivalent to the electric charge corresponding to the value "8" generated in sensor electrode 34 of sensor element 30. In addition, switch 65 is turned on and outputs, to integrator circuit 67, an electric charge equivalent to the electric charge corresponding to the value "−8" generated in sensor electrode 35.

Accordingly, capacitor 58 of integrator circuit 56 holds an output signal as an electric charge corresponding to value "6" which is provided by integrating the sum of electric charge Q34 of the signal S34 shown in FIG. 3 and the electric charge output from D/A converter 48, during the period P2. Similarly, capacitor 69 of integrator circuit 67 holds an output signal as an electric charge corresponding to value "−6" which is provided by integrating the sum of electric charge Q35 of the signal S35 and the electric charge output from D/A converter 66, during the period P2. Comparator 71 outputs to flip-flop 72 a one-bit digital signal representing the comparison result between the output signals of integrator circuits 56 and 67. As a result, the voltage held in integrator circuit 56 decreases by an amount of electric charge corresponding to value "2", whereas the voltage held in integrator circuit 67 increases by the amount of electric charge corresponding to value "2" every time the above operation is repeated over the periods P1 and P2. Consequently, comparator unit 70 continues to output one-bit digital signal of "1" until the voltages held by integrator circuits 56 and 67 correspond to an electric charge corresponding to value "0". Then, comparator 71 outputs a one-bit digital signal of "0" when the voltage held by integrator circuit 56 becomes equivalent to an electric charge corresponding to value "−2", and the voltage held in integrator circuit 67 becomes equivalent to an electric charge corresponding to value "2". Flip-flop 72 then sends an output signal of value "0" to D/A switching units 47 and 59 to have D/A switching units 47 and 59 output a voltage of the electric charge corresponding to value "10" from reference voltage V49 of D/A converter 48 as well as a voltage of the electric charge corresponding to value "−10" from reference voltage V61 of D/A converter 66, and their corresponding electric charges are stored in capacitors 52 and 63, respectively. As a result, a voltage of the electric charge corresponding to value "16" is retained in integrator circuit 56, and a voltage of the electric charge corresponding to value "−16" is retained in integrator circuit 67. Then, the output voltages of integrator circuits 56 and 67 change by electric charge corresponding to value "2", and comparator 71 outputs one-bit digital signal of value "1" nine times, and then, outputs one-bit digital signal of value "0" only once. The one-bit digital signals are output after converted into multi-bit signals of value "0.9" so that they are detected as the signals of angular velocity.

FIG. 3 illustrates undesired signals U34 and U35 generated in sensor electrodes 34 and 35, respectively. Undesired signals U34 and U35 have the same phases as the monitor signals. Undesired signal U34 has a phase delayed by 90 degrees from output signal S34 generated in sensor electrode 34, and the undesired signal U35 has a phase delayed by 90 degrees from output signal S35 generated in sensor electrode 35. Undesired signals U34 and U35 are integrated by integrator circuits 56 and 67 in period P1, respectively, and have values "0", thus being cancelled.

An operation of angular velocity sensor 1001 according to Embodiment 1 detecting a disconnection in a circuit around sensor electrodes 34 and 35 will be described. In this case, no angular velocity is applied to sensor element 30.

When disconnection detecting switch 78 is turned on during period P2, electric charge Q77 corresponding to value "2" is input from voltage source 77 to sensor electrode 34, as shown in FIG. 3. Similarly, when disconnection detecting switch 80 is turned on during period P2, electric charge Q79 corresponding to value "−2" is input from voltage source 79 to sensor electrode 35. In the succeeding period P1, the electric charge corresponding to value "2" is stored in capacitor 58 of integrator circuit 56, and the electric charge corresponding to value "−2" is stored in capacitor 69 of integrator circuit 67. As a result, comparator 71 outputs a one-bit digital signal value "1" corresponding to value "4" as the compared result, and flip-flop 72 latches the one-bit digital signal.

If a disconnection occurs in a circuit pattern around sensor electrode 34, electric charge Q77 shown in FIG. 3 is not input from voltage source 77 to sensor electrode 34. This causes comparator 71 to output the electric charge stored in capacitor 69 of integrator circuit 67 as a compared result, and this one-bit digital signal value "1" corresponding to value "2" is latched by flip-flop 72. If a disconnection occurs in a circuit pattern around sensor electrode 35, electric charge Q79 shown in FIG. 3 is not input from voltage source 79 to sensor electrode 35. This causes comparator 71 to output the electric charge stored in capacitor 58 of integrator circuit 56 as the compared result, and this one-bit digital signal value "1" corresponding to value "2" is latched by flip-flop 72. If a disconnection occurs in circuit patterns around both sensor electrodes 34 and 35, none of the electric charges Q77 and Q79 shown in FIG. 3 is input from voltage sources 77 and 79 to sensor electrodes 34 and 35, respectively. Comparator 71 hence outputs one-bit digital signal value "0" corresponding to value "0" as a comparison result, and the one-bit digital signal is latched by flip-flop 72. Thus, the value of the digital signal output from flip-flop 72 is monitored while disconnection detecting switches 78 and 80 are turned on, thereby detecting the disconnection in the circuit patterns around sensor electrodes 34 and 35.

As discussed, the electrical charge stored in any of sensor electrodes 34 and 35 decreases when a circuit pattern around at least one of sensor electrodes 34 and 35 is disconnected. This decreases the value of the signal output from comparator unit 70, and allows the disconnection in the circuit patterns around sensor electrodes 34 and 35 to be detected. This operation provides angular velocity sensor 1001 with high reliability which does not continue to output a signal not corresponding to the angular velocity even if any conductive pattern is disconnected in circuits around sensor electrodes 34 and 35.

Here, the electric charges supplied from voltage sources 77 and 79 are generally equal in their absolute values, but of the polarities opposite to each other. It is for this reason that the value of the signal output from comparator unit 70 becomes approximately one half when a circuit pattern of one of sensor electrodes 34 and 35 is disconnected, hence allowing the disconnection to be determined.

The absolute value of the sum of the electric charge generated in sensor electrode 34 due to the Coriolis force attributed to an angular velocity applied to sensor element 30 and the electric charge supplied from voltage source 77 is smaller than the absolute value of the electric charge supplied from D/A converter 48. In addition, the absolute value of the sum of the electric charge generated in sensor electrode 35 by the Coriolis force attributed to the angular velocity applied to sensor element 30 and the electric charge supplied from voltage source 79 is smaller than the absolute value of the electric charge supplied from D/A converter 66. For this reason, the electric charges output from D/A converters 48 and 66 are not saturated with the sum of the electric charges output from sensor electrodes 34 and 35 and voltage sources 77 and 79, thereby hence allowing ΣΔ modulator 73 to operate continuously appropriately.

As discussed, sensor electrodes 34 and 35 are provided on vibration body 31 and generate electric charges responsive to the angular velocity applied to vibration body 31. Driver circuit 40 vibrates vibration body 31 at the predetermined driving frequency. D/A converter 48 outputs at least two levels of electric charges and reference voltages V49 and V50. D/A converter 66 outputs at least two levels of electric charges and reference voltages V60 and V61. Integrator circuit 56 integrates the electric charge generated by sensor electrode 34 and the electric charge output from D/A converter 48. Integrator circuit 67 integrates the electric charge generated by sensor electrode 35 and the electric charge output from D/A converter 66. Comparator unit 70 compares the output signal from integrator circuit 56 with the output signal from integrator circuit 67. D/A switching unit 47 switches the level of the output signal from D/A converter 66 according to a comparison result performed by comparator unit 70. D/A switching unit 59 switches the level of the output signal from D/A converter 48 according to the comparison result performed by comparator unit 70. Disconnection detecting switch 78 is connected between sensor electrode 34 and integrator circuit 56. Voltage source 77 supplies an electric charge to a point between sensor electrode 34 and integrator circuit 56 via disconnection detecting switch 78. Disconnection detecting switch 80 is connected between sensor electrode 35 and integrator circuit 67. Voltage source 79 supplies an electric charge to a point between sensor electrode 35 and integrator circuit 67 via disconnection detecting switch 80.

Exemplary Embodiment 2

Figure 4:
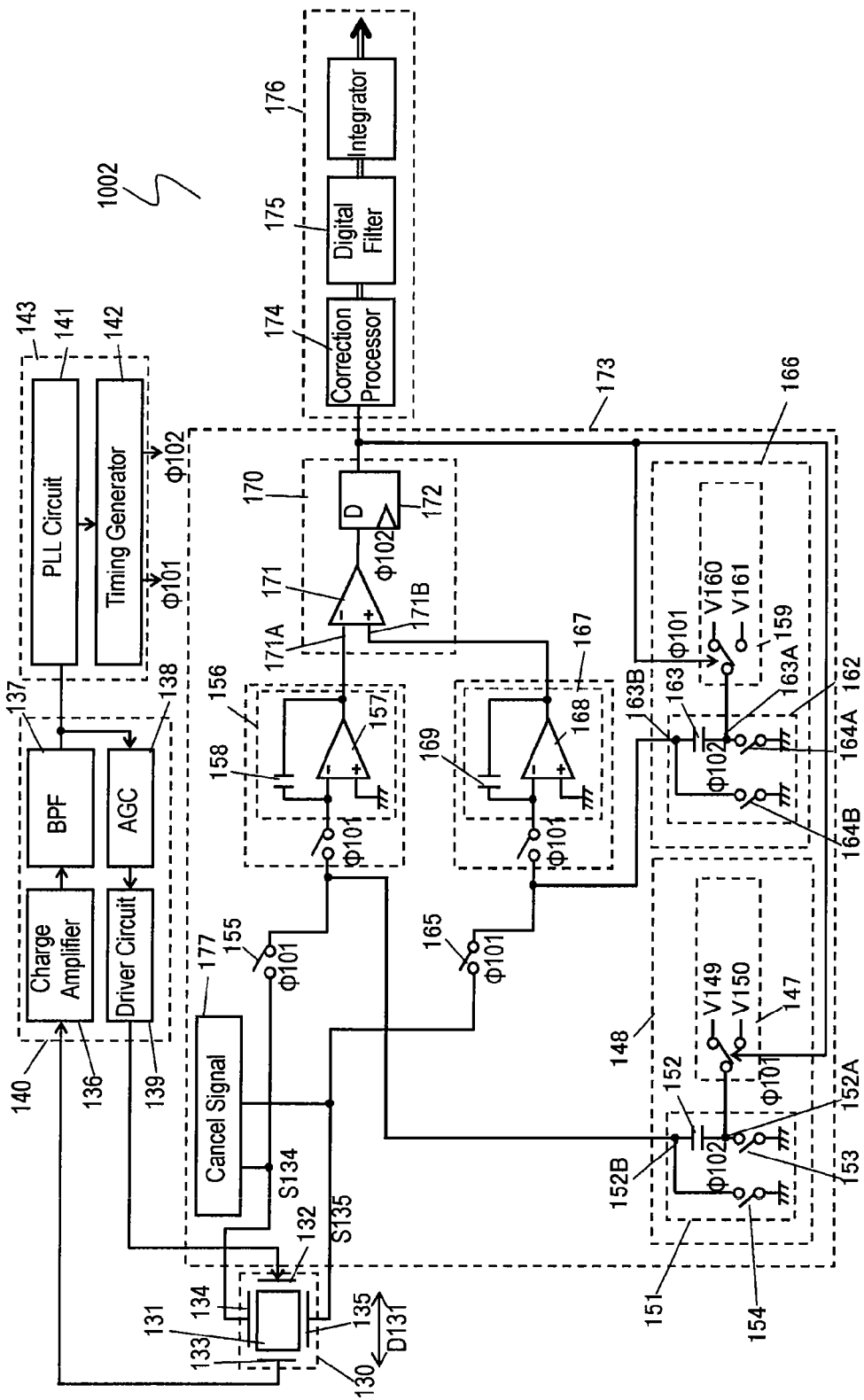
FIG. 4 is a circuit diagram of an angular velocity sensor according to Exemplary Embodiment 2 of the invention.

FIG. 4 is a circuit diagram of angular velocity sensor 1002 according to Exemplary Embodiment 2 of the present invention.

Sensor element 130 includes vibration body 131, driving electrode 132 including a piezoelectric element for vibrating vibration body 131, monitor electrode 133 including a piezoelectric element for generating an electric charge responsive to vibration of vibration body 131, and sensor electrodes 134 and 135 including a piezoelectric element for generating electric charges when an angular velocity is applied to sensor element 130. Sensor electrodes 134 and 135 generate the electric charges having polarities opposite to each other. Charge amplifier 136 amplifies the electric charge output from monitor electrode 133 to a level of predetermined amplitude, and converts the charge into a voltage. Band-pass filter (BPF) 137 outputs a monitor signal after removing a noise component from the voltage output from charge amplifier 136. Automatic gain control (AGC) circuit 138 includes a half-wave rectifier and a smoothing circuit, and generates a direct current (DC) signal by performing a half-wave rectification and a smoothing to the voltage output from band-pass filter 137. Based on this DC signal, AGC circuit 138 either amplifies or attenuates the voltage of band-pass filter 37, and outputs it. Driving circuit 139 outputs a driving signal to driving electrode 132 of sensor element 130 based on the voltage output from AGC circuit 138. Charge amplifier 136, band-pass filter 137, AGC circuit 138 and driving circuit 139 constitute driver circuit 140.

PLL circuit 141 multiplies a frequency of the voltage output from band-pass filter 137 of driver circuit 140, integrates in time and reduces a phase noise of the voltage, and outputs the resulting voltage. Timing generator circuit 142 multiplies a frequency of the voltage output from PLL circuit 141, generates and outputs timing signals Φ1 and Φ2. PLL circuit 141 and timing generator circuit 142 constitute timing control circuit 143.

Figure 5:
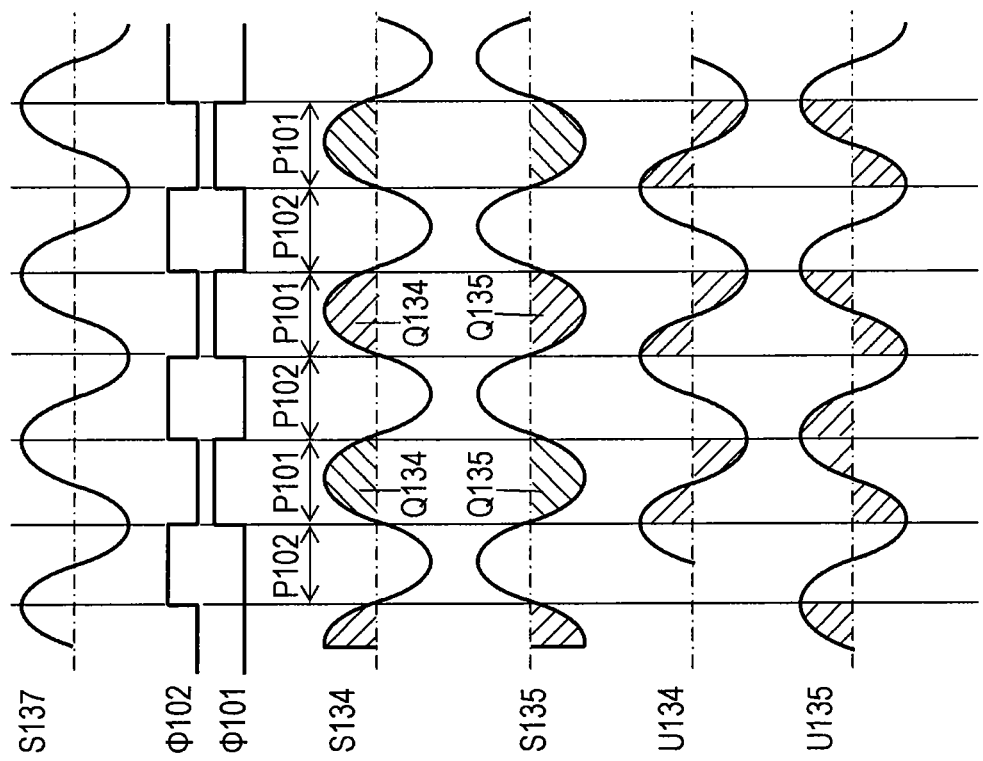
FIG. 5 illustrates signals of the angular velocity sensor according to Embodiment 2.

FIG. 5 illustrates waveforms of timing signals Φ1 and Φ2. Timing signals Φ1 and Φ2 have polarities opposite to each other, and each of the timing signals has two values consisting of a high level and a low level. Timing signal Φ2 is at the high level and timing signal Φ1 is at the low level in a period P102. On the other hand, timing signal Φ2 is at the low level and timing signal Φ1 is at the high level in a period P101. Timing signals Φ1 and Φ2 define the periods P101 and P102 alternately and continuously.

D/A switching unit 147 selectively switches and outputs any of reference voltages V149 and V150 in response to a predetermined signal. D/A output unit 151 includes capacitor 152, switch 153 connected between one terminal 152A of capacitor 152 and the ground, and switch 154 connected between the other terminal 152B of capacitor 152 and the ground. The voltage output from D/A switching unit 147 is input to terminal 152A of capacitor 152. Switches 153 and 154 are turned on in the period P102 to discharge an electric charge stored in capacitor 152. D/A switching unit 147 and D/A output unit 151 constitute D/A converter 148. D/A converter 148 discharges the electric charge stored in capacitor 152, and inputs and outputs an electric charge corresponding to the reference voltage output from D/A switching unit 147 during the period P101. Switch 155 outputs an output signal as an electric current supplied from sensor electrode 134 during the period P101. The signal output from switch 155 is input to integrator circuit 156. Integrator circuit 156 includes operational amplifier 157 and capacitor 158 connected between an output terminal and an inverting input terminal of operational amplifier 157.

D/A switching unit 159 selectively switches and outputs reference voltages V160 and V161 in response to a predetermined signal. D/A output unit 162 includes capacitor 163, switch 164A connected to one terminal 163A of capacitor 163, and switch 164B connected to the other terminal 163B of capacitor 163. The voltage output from D/A switching unit 159 is input to terminal 163A of capacitor 163. Switches 164A and 164B are turned on in the period 102 to discharge an electric charge stored in capacitor 163. D/A switching unit 159 and D/A output unit 162 constitute D/A converter 166. D/A converter 166 discharges the electric charge stored in capacitor 163 and inputs and outputs an electric charge corresponding to the reference voltage output from D/A switching unit 159 during the period P102. Switch 165 outputs an output signal as an electric current supplied from sensor electrode 135 during the period P101. The output from second switch 165 is input to integrator circuit 167. Integrator circuit 167 includes operational amplifier 168 and capacitor 169 connected between an output terminal and a non-inverting input terminal of operational amplifier 168.

Comparator unit 170 includes comparator 171 and D-type flip-flop 172. Comparator 171 compares a signal output from integrator circuit 156 with a signal output from integrator circuit 167, and outputs a one-bit digital signal consisting of one bit to D-type flip-flop 172. D-type flip-flop 172 latches the one-bit digital signal at the beginning of period P101 and outputs the latched signal. The latched signal is input to D/A switching unit 147 of D/A converter 148, and switches reference voltages V149 and V150. The latched signal is also input to D/A switching unit 159 in D/A converter 166, and switches reference voltages V160 and V161. D/A converters 148 and 166, integrator circuits 156 and 167 and comparator unit 170 constitute processor 173 which is a ΣΔ modulator. Processor 173 ΣΔ-modulates and detects the electric charge output from sensor electrodes 134 and 135 of sensor element 130 to convert the signal into a one-bit digital signal and output the one-bit digital signal.

Correction processor 174 receives the one-bit digital signal output from flip-flop 172, and performs a corrective operation on the one-bit digital signal by a substitution process using a predetermined correction factor. Upon receiving one-bit differential signals of values "0" and "1", correction processor 174 substitutes them with multi-bit digital signals of values "−5" and "5", respectively, and outputs the multi-bit digital signals in the case that the correction factor is "5". The digital signals output from correction processor 174 are input to digital filter 175 that carries out a filtering process to remove noise components in the multi-bit digital signals. Correction processor 174 and digital filter 175 constitute operation unit 176. Operation unit 176 latches the one-bit digital signals according to the timing signal Φ101, carries out the corrective operation and the filtering process, and outputs multi-bit digital signals. Timing control circuit 143, processor 173, and operation unit 176 constitute a sensor circuit.

Cancellation signal output circuit 177 supplies cancellation signal C134 to a point between sensor electrode 134 and integrator circuit 156, and supplied a cancellation signal C135 to a point between sensor electrode 135 and integrator circuit 167. Sensor electrode 134 generates undesired signal U134 due to imbalance in the mass of sensor element 130. Sensor electrode 135 also generates undesired signal U135 due to the imbalance in the mass of sensor element 130. Cancellation signal C134 is a rectangular wave of an electric charge of the same amount as undesired signal U134 and having a polarity opposite to undesired signal U134. Cancellation signal C135 is a rectangular wave having an electric charge of the same amount as undesired signal U135 and having a polarity opposite to undesired signal U135.

An operation of angular velocity sensor 1002 according to Embodiment 2 will be described below.

When an alternating voltage is applied to driving electrode 132 of sensor element 130, vibration body 131 vibrates at its resonant frequency and generates an electric charge in monitor electrode 133. The electric charge generated in monitor electrode 133 is input to charge amplifier 136 of driver circuit 140, and is converted it into an output voltage of sinusoidal wave. Band-pass filter 137 removes noise components and extracts only a resonant frequency component of vibration body 131 from the output voltage of charge amplifier 136, and outputs signal S137 having a sinusoidal waveform shown in FIG. 5. AGC circuit 138 including a half-wave rectification and a smoothing circuit converts signal S137 into a direct current (DC) signal. When this DC signal is large, AGC circuit 138 sends a signal to driving circuit 139 to attenuate the output signal of band-pass filter 137. When the DC signal is small, AGC circuit 138 sends a signal to driving circuit 139 to amplify the output signal of band-pass filter 137. Driving circuit 139 is thus controlled such that vibration body 131 vibrates with constant amplitude. In timing control circuit 143, PLL circuit 141 generates a signal by multiplying a frequency of signal S137. Based on this signal, timing generator circuit 142 generates timing signals Φ101 and Φ102 shown in FIG. 5. Timing signals Φ101 and Φ102 are input to processor 173 and correction processor 174, and determine switching timing of the switches and latching timing of a latching circuit.

When sensor element 130 having a mass m rotates about the center axis in a longitudinal direction of vibration body 131 at angular velocity ω while flexuously vibrating at velocity V in a driving direction D131 shown in FIG. 4, Coriolis force F expressed given by the following formula is generated in sensor element 130.

$$F = 2 \times m \times V \times \omega$$

This Coriolis force F generates signals S134 and S135 of electric currents shown in FIG. 5 in sensor electrodes 134 and 135, respectively. Since these signals S134 and S135 are generated by Coriolis force F, they have sinusoidal waveforms with the phases shifted by 90 degrees from signal S137 generated in monitor electrode 133. As shown in FIG. 5, signals S134 and S135 are in the relationship of positive polarity signal and negative polarity signal.

An operation of processor 173 which is a ΣΔ modulator in this case will be described below. Timing signals Φ101 and Φ102 define periods P101 and P102 that repeat continuously alternatively. Processor 173 ΣΔ-modulates the positive polarity signal and the negative polarity signal output from sensor electrodes 134 and 135 according to timing signals Φ101 and Φ102, and converts the signals into one-bit digital signals.

An operation of processor 173 during the periods P101 and P102 will be described below. For example, for the purpose of the following explanation, a predetermined angular velocity is applied to sensor element 130 to rotate sensor element 130 about the center axis thereof so that signals S134 and 5135 having a maximum current corresponding to a value "8" are generated from sensor electrodes 134 and 135, respectively.

In the period P101, a voltage provided by the electric charge corresponding to the value "8" generated in sensor electrode 134 is retained in capacitor 158 of integrator circuit 156. This voltage retained in capacitor 158 is input to inverting input terminal 171A of comparator 171. Similarly, the electric charge generated in sensor electrode 135 is retained in capacitor 169 of integrator circuit 167. This voltage of the electric charge corresponding to a value "−8" retained in capacitor 169 is input to non-inverting input terminal 171B of comparator 171. Consequently, one-bit digital signal "1" produced by comparator 171 as a comparison result is input to flip-flop 172, and is latched by flip-flop 172 at the beginning of period P102. Switches 153 and 154 are turned on in the period P102, and discharge the electric charge retained in capacitor 152. Similarly, switches 164A and 164B are turned on in the period P102, and discharge the electric charge retained in capacitor 163. The digital signal "1" latched by flip-flop 172 is input to D/A switching unit 147 in the next period P101, and switches the reference voltage V150 that generates an electric charge corresponding to value "−10". Similarly, the digital signal "1" latched by flip-flop 172 is input to D/A switching unit 159 in the next period P101, and switches the reference voltage V160 that generates an electric charge corresponding to value "10". As a result, an electric charge equivalent to the electric charge corresponding to the value "−10" from reference voltage V150 is stored in capacitor 152 of D/A output unit 151, and is input to integrator circuit 156. At the same time, an electric charge equivalent to the electric charge corresponding to the value "10" from reference voltage V160 is stored in capacitor 163 of D/A output unit 162, and is input to integrator circuit 167. In this same period P101, switch 155 is turned on and outputs, to integrator circuit 156, an electric charge equivalent to the electric charge corresponding to the value "8" generated in sensor electrode 134. In addition, switch 165 is turned on in the period P101 and outputs, to integrator circuit 167, an electric charge equivalent to the electric charge corresponding to the value "8" generated in sensor electrode 135.

Accordingly, during the period P102, capacitor 158 of integrator circuit 156 holds an output signal consisting of an electric charge corresponding to value "6" provided by integrating the sum of electric charge Q134 of the signal S134 shown in FIG. 5 and the electric charge output from D/A converter 148. Similarly, capacitor 169 of integrator circuit 167 holds an output signal consisting of an electric charge corresponding to value "−6" provided by integrating the sum of electric charge Q135 of the signal S135 shown in FIG. 5 and the electric charge output from D/A converter 166. Comparator 171 outputs, to flip-flop 172, a one-bit digital signal representing a comparison result between the output signals of integrator circuits 156 and 167. The voltage held in integrator circuit 156 decreases by an amount of electric charge corresponding to value "2", while the voltage held in integrator circuit 167 increases by the amount of electric charge corresponding to value "2" every time the above operation is repeated over the periods P101 and P102. Consequently, comparator unit 170 outputs one-bit digital signal of "1" until the voltages held in integrator circuits 156 and 167 become equivalent to an electric charge corresponding to value "0". Then, comparator 171 outputs a one-bit digital signal of "0" when the voltage held in integrator circuit 156 becomes equivalent to an electric charge corresponding to value "−2", and the voltage held in integrator circuit 167 becomes equivalent to an electric charge corresponding to value "2". Flip-flop 172 then sends an output signal of value "0" to D/A switching unit 147 to cause D/A switching unit 147 to output a voltage of the electric charge corresponding to value "10" from reference voltage V149 of D/A converter 148, and then, the corresponding electric charge is stored in capacitor 152. Simultaneously, flip-flop 172 sends an output signal of value "−1" to D/A switching unit 159 to cause D/A switching unit 159 to output a voltage of the electric charge corresponding to value "−10" from reference voltage V161 of D/A converter 166, and then, the corresponding electric charge is stored in capacitor 163. As a result, a voltage of the electric charge corresponding to value "16" is retained in integrator circuit 156, and a voltage of the electric charge corresponding to value "−16" is retained in integrator circuit 167. The output voltages of integrator circuits 156 and 167 change thereafter by an electric charge corresponding to value "2", and comparator 171 outputs one-bit digital signal of value "1" nine times, and then, outputs one-bit digital signal of value "0" only once. The one-bit digital signals are converted into multi-bit signals of value "0.9" and output so as to be detected as the signals indicating the angular velocity.

FIG. 5 illustrates undesired signals U134 and U135 generated in sensor electrodes 134 and 135, respectively. Undesired signals U134 and U135 have the same phases as monitor signals. Undesired signal U134 has a phase delayed by 90 degrees from output signal S134 generated in sensor electrode 134. Undesired signal U135 has a phase delayed by 90 degrees from output signal S135 generated in sensor electrode 135. When undesired signals U134 and U135 are integrated by integrator circuits 156 and 167, respectively, their values become "0", and they are therefore canceled nearly completely.

Figure 6:
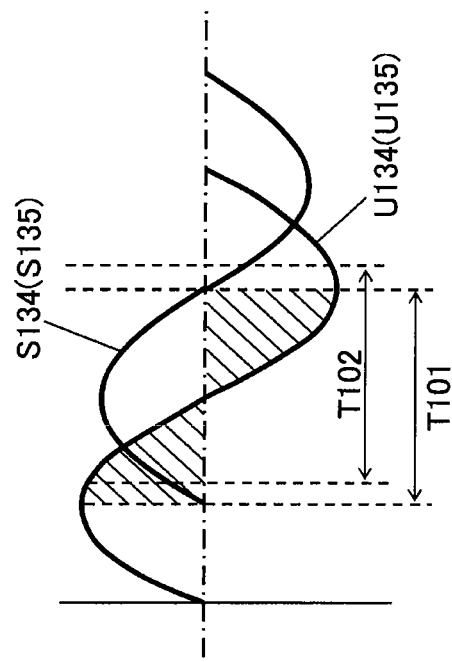
FIG. 6 illustrates signals of the angular velocity sensor according to Embodiment 2.

Actuality, however, the phase characteristic has a deviation due to a time constant determined by capacitances of capacitors 158 and 169, and resistances of the circuit conductors in integrator circuits 156 and 167. FIG. 6 illustrates timing signal P101, signal S134 (S135), and undesired signal U134 (U135) having the phases shifted due to the deviation of their phase characteristic. An integration time during the period P101 changes from the ideal period T101 to period T102. Under this condition, undesired signal U134 (U135) cannot be cancelled completely even when undesired signal U134 (U135) is integrated because the area of a negative side becomes larger than that of a positive side. In the case that vibration body 131 has a small size to provide small angular velocity sensor 1002, imbalance in the mass of vibration body 131 cannot be corrected by trimming, hence preventing undesired signals U134 and U135 from being removed completely only by the integration.

Figure 7:
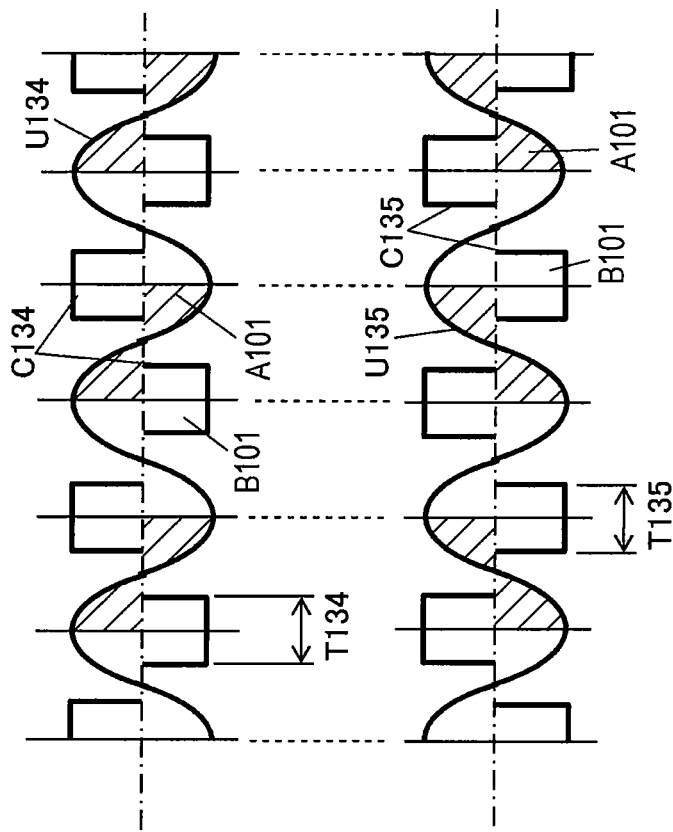
FIG. 7 illustrates cancellation signals of the angular velocity sensor according to Embodiment 2.

In angular velocity sensor 1002 according to Embodiment 2, cancellation signal output circuit 177 injects cancellation signal C134 to a point between sensor electrode 134 and processor 173, while cancellation signal C135 to a point between sensor electrode 135 and processor 173. Cancellation signals C134 and C135 are rectangular waves having the same amplitudes as undesired signals U134 and U135 and have polarities opposite to undesired signals U134 and U135. As shown in FIG. 7, widths T134 and T135 of the rectangular waves of undesired signals U134 and U135 are determined such that area B101 formed by cancellation signals C134 and C135 becomes equal to area A101 formed by the sinusoidal waves of undesired signals U134 and U135 having frequency f in a half cycle ($1/(2\times f)$). The widths T134 and T135 of cancellation signals C134 and C135 are determined to be ($2/\pi$) times the half cycle ($1/(2\times f)$), that is, about 64% of the undesired signals U134 and U135, as shown in FIG. 7.

Undesired signals U134 and U135 can be removed by integrating undesired signals U134 and U135 during the period P101 by integrator circuits 156 and 167 even when a deviation occurs in the phase characteristic due to the time constant determined by the capacitances of capacitors 158 and 169 and resistances of the circuit conductors in integrator circuits 156 and 167, since generally the same deviation occurs in the electric charges of the cancellation signals C134 and C135 having the opposite polarities.

Amplitude of the rectangular waves of cancellation signals C134 and C135 can be determined according to an amount of drift from a zero point of the output signal generated while no angular velocity is applied to sensor element 130.

Cancellation signal output circuit 177 includes a D/A converter circuit that outputs cancellation signals C134 and C135 of the rectangular waves synchronized with the driving frequency of sensor element 130, and cancels the undesired signals U134 and U135 generated in sensor electrodes 134 and 135. This can lower the operating frequency of the D/A converter, accordingly reducing undesired signals U134 and U135 by the D/A converter having small power consumption.

A total amount of the electric charge output from this D/A converter can be controlled accurately by adjusting, in a time-axis direction, the rectangular waves of cancellation signals C134 and C135 output from cancellation signal output circuit 177. The width of the rectangular wave signals is about 64% of the half cycle of undesired signals U134 and U135, and the total amount of the electric charge output from cancellation signal output circuit 177 can be controlled by adjusting amplitude of these rectangular wave signals.

In angular velocity sensor 1002 according to Embodiment 2, cancellation signals C134 and C135 shown in FIG. 7 are input from cancellation signal output circuit 177 to a point between sensor electrode 134 and processor 173, and to a point between sensor electrode 135 and processor 173 respectively. FIG. 8A illustrates another cancellation signal C1134 output from cancellation signal output circuit 177 output to the point between sensor electrode 134 and processor 173. In this case, cancellation signal output circuit 177 does not input any cancellation signal to the point between sensor electrode 135 and processor 173. Cancellation signal C1134 has amplitude twice that of cancellation signal C134 shown in FIG. 7. This eliminates an adverse influence due to a shift in the phases of undesired signals U134 and U135 when comparator unit 170 compares the signals output from integrator circuits 156 and 167. This structure reduces the size of the circuit since cancellation signal C1134 is injected only to the point between sensor electrode 134 and processor 173, while no cancellation signal is injected to the point between sensor electrode 135 and processor 173. Cancellation signal output circuit 177 includes a D/A converter circuit that outputs cancellation signal C1134 having a rectangular wave synchronized with the driving frequency of sensor element 130 (vibration body 131) for canceling undesired signals U134 and U135 generated in sensor electrodes 134 and 135. This can thus lower the operating frequency of the D/A converter, and allows the D/A converter having small power consumption to reduce the undesired signals U134 and U135.

FIG. 8B illustrates still another cancellation signal C1135 input from the cancellation signal output circuit 177 to the point between sensor electrode 135 and processor 173. In this case, cancellation signal output circuit 177 does not input any cancellation signal to the point between sensor electrode 135 and processor 173. Cancellation signal C1135 has amplitude twice that of cancellation signal C135 shown in FIG. 7. This eliminates an adverse influence due to a shift in the phases of undesired signals U134 and U135 when comparator unit 170 compares the signals output from integrator circuits 156 and 167. This structure reduces the size of the circuit since cancellation signal C1135 is injected only to the point between sensor electrode 135 and processor 173, while no cancellation signal is injected to the point between sensor electrode 134 and processor 173. Cancellation signal output circuit 177 includes a D/A converter circuit that outputs cancellation signal C1135 having a rectangular wave synchronized with the driving frequency of sensor element 130 (vibration body 131) for canceling out the undesired signals U134 and U135 generated in sensor electrodes 134 and 135. This can thus lower the operating frequency of the D/A converter, and the D/A converter having small power consumption reduces the undesired signals U134 and U135.

Figure 9:
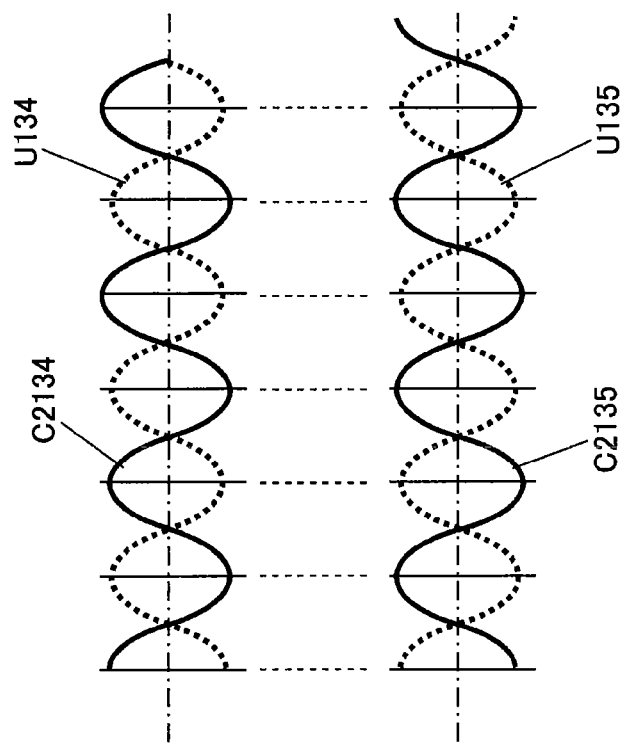
FIG. 9 illustrates further cancellation signals of the angular velocity sensor according to Embodiment 2.
Figure 11:
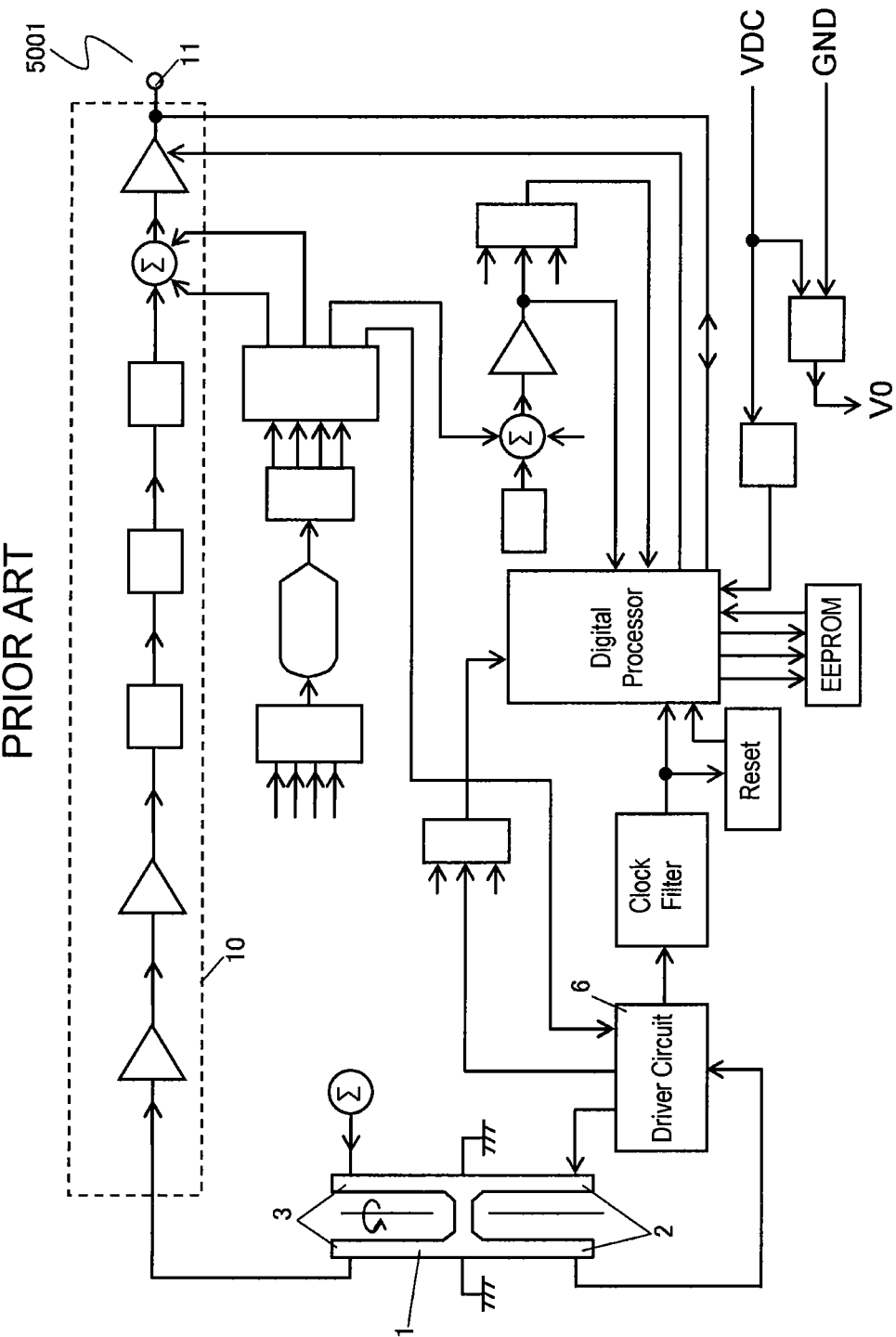
FIG. 11 is a circuit block diagram of a conventional angular velocity sensor.
Figure 12:
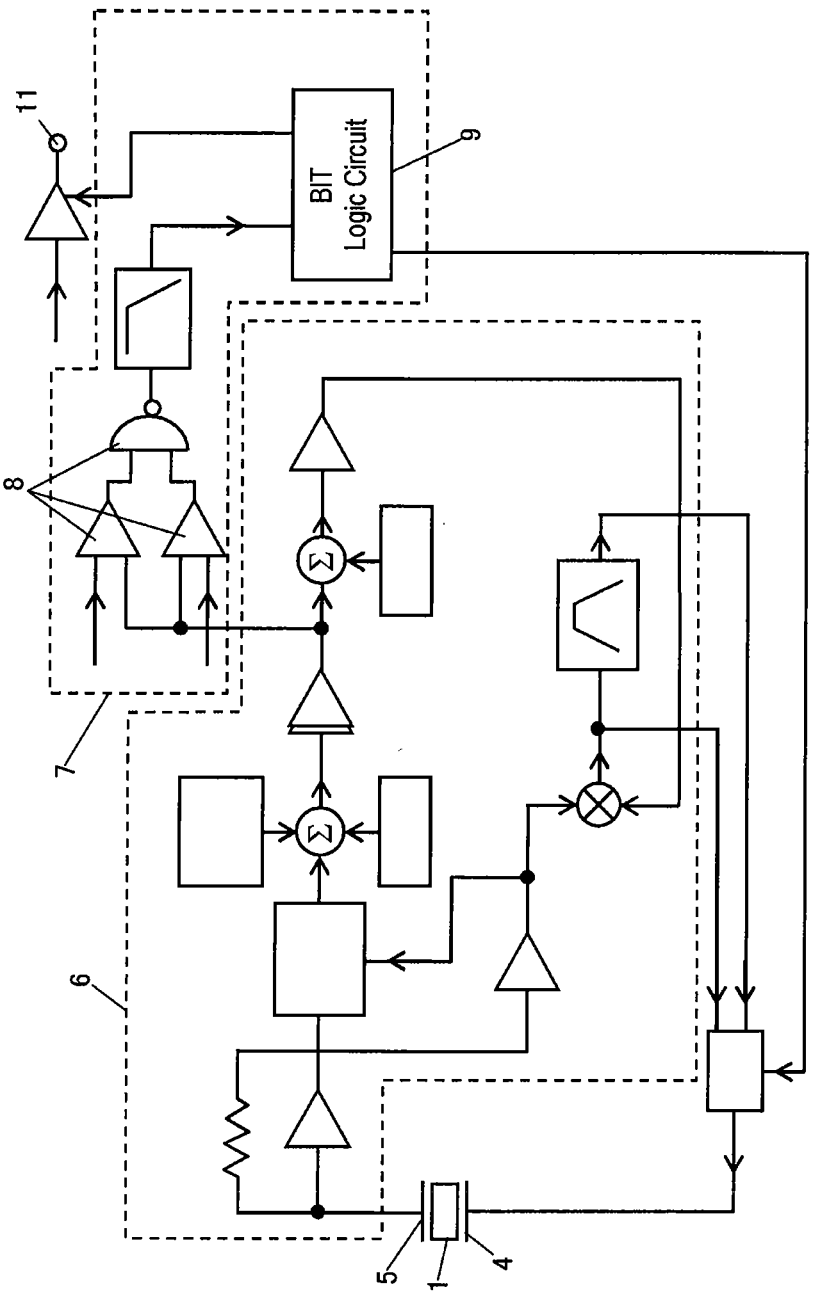
FIG. 12 is a block diagram of a driver circuit and a failure detector circuit of the angular velocity sensor shown in FIG. 11.
Figure 13:
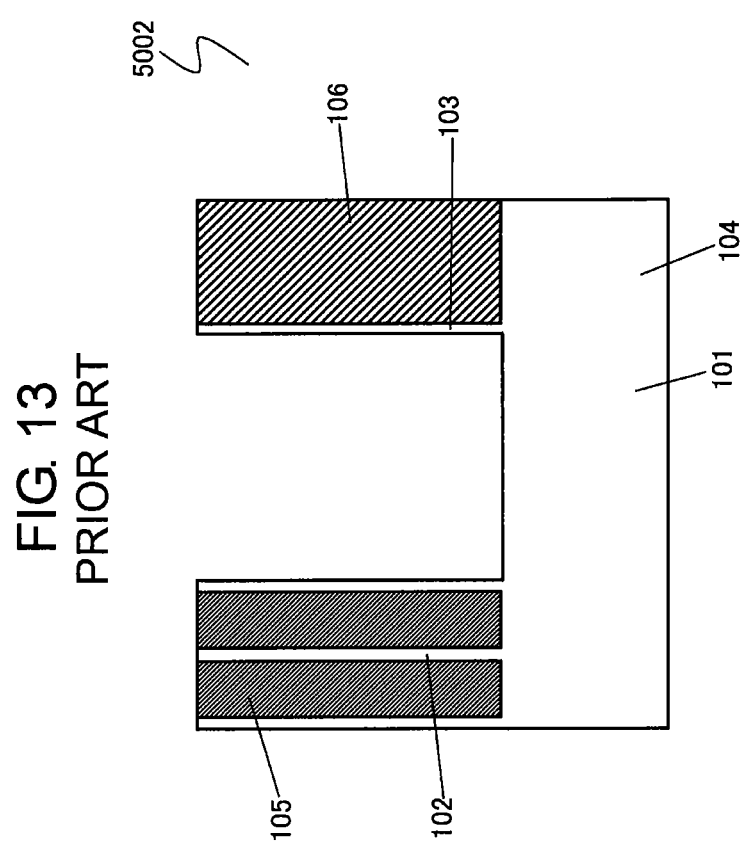
FIG. 13 is a side view of another conventional angular velocity sensor.
Figure 14:
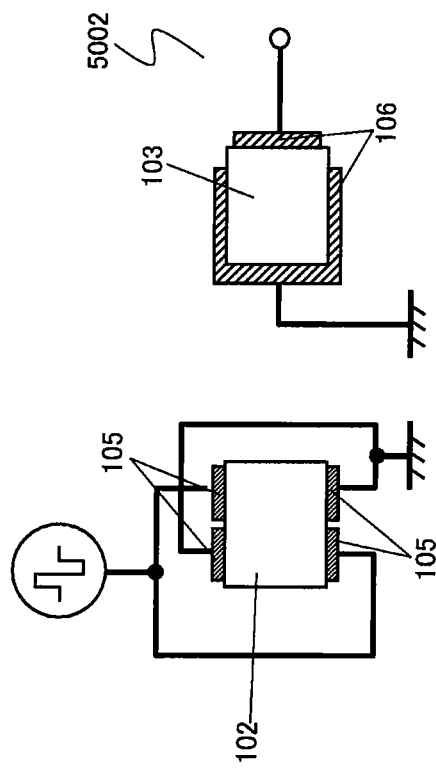
FIG. 14 is a sectional view of the angular velocity sensor shown in FIG. 13.
Figure 15:
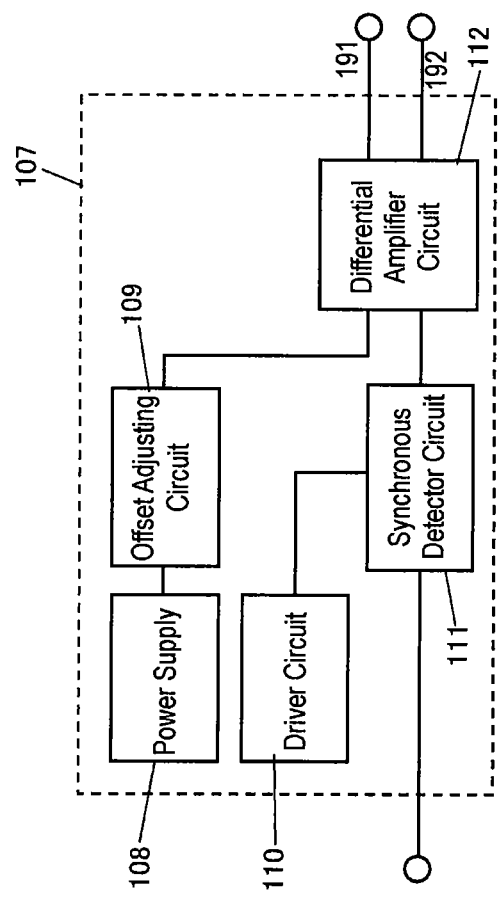
FIG. 15 is a circuit block diagram of the angular velocity sensor shown in FIG. 13.
Figure 17A:
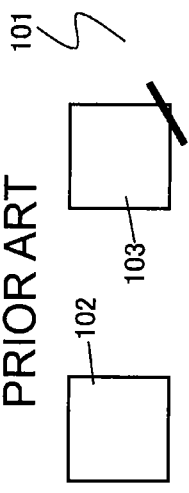
FIG. 17A is a cross-sectional view of the angular velocity sensor shown in FIG. 13.
Figure 17B:
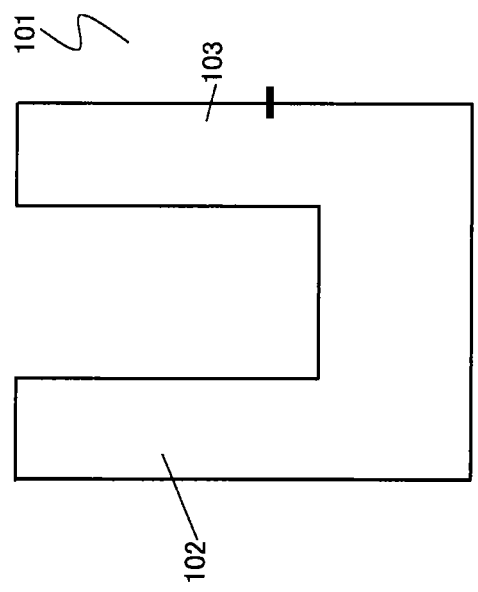
FIG. 17B is a side view of the angular velocity sensor shown in FIG. 13.
Figure 16:
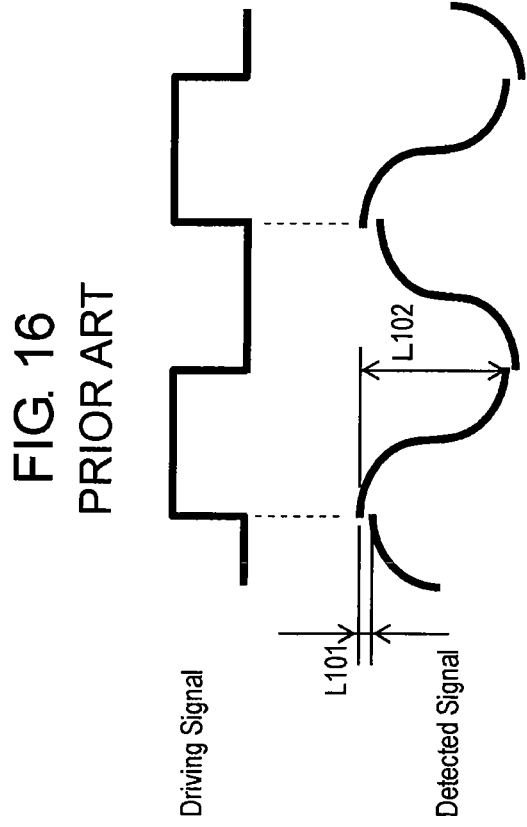
FIG. 16 illustrates an undesired signal in the angular velocity sensor shown in FIG. 13.

FIG. 9 illustrates further cancellation signal C2134 injected from cancellation signal output circuit 177 to the point between sensor electrode 134 and processor 173, and further cancellation signal C2135 injected to the point between sensor electrode 135 and processor 173. Cancellation signals C2134 and C2135 have sinusoidal waveforms having the same phases and the same amplitudes as undesired signals U134 and U135. Cancellation signals C2134 and C2135 can cancel the undesired signals U134 and U135 accurately in integrator circuits 156 and 167, respectively.

Figure 10:
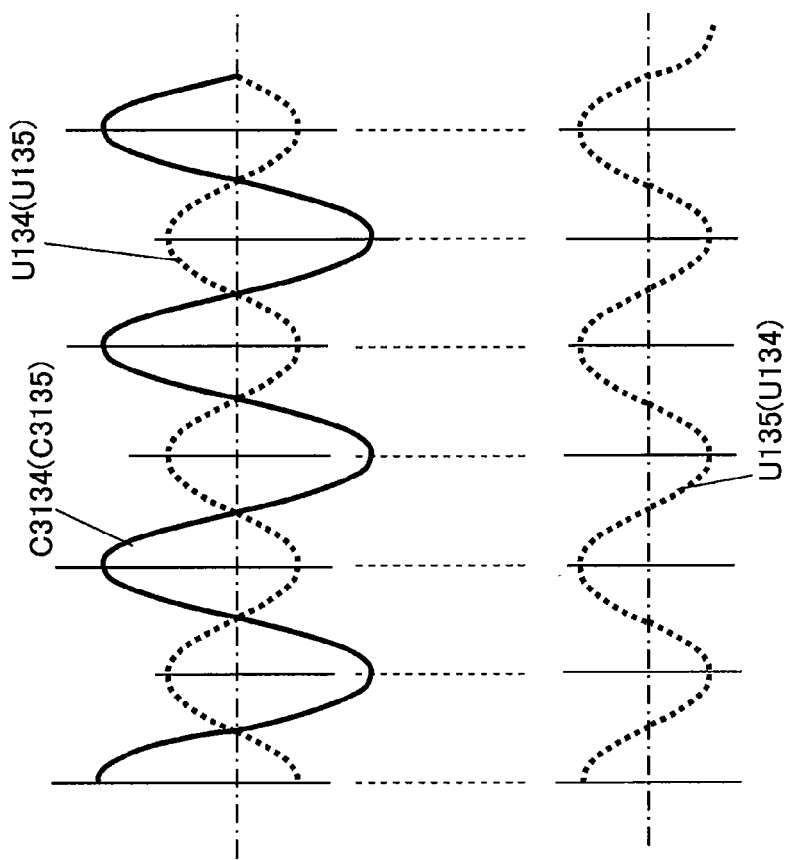
FIG. 10 illustrates further cancellation signals of the angular velocity sensor according to Embodiment 2.

FIG. 10 illustrates further cancellation signal C3134 injected from cancellation signal output circuit 177 to the point between sensor electrode 134 and processor 173. Cancellation signal C3134 has a sinusoidal waveform which is equivalent to the difference between undesired signal U134 generated in sensor electrode 134 and undesired signal U135 generated in sensor electrode 135, which has the same frequency as the driving frequency of sensor element 130. In this case, cancellation signal output circuit 177 does not input any cancellation signal to the point between sensor electrode 135 and processor 173. This can eliminate an adverse influence due to a shift in the phases of undesired signals U134 and U135 precisely when comparator unit 170 compares the signals output from integrator circuits 156 and 167. This structure reduces the size of the circuit since cancellation signal C3134 is injected only to the point between sensor electrode 135 and processor 173, while no cancellation signal is injected to the point between sensor electrode 135 and processor 173.

FIG. 10 also illustrates further cancellation signal C3135 injected from cancellation signal output circuit 177 to the point between sensor electrode 135 and processor 173. Cancellation signal C3135 has a sinusoidal waveform which is equivalent to the difference between undesired signal U134 generated in sensor electrode 134 and undesired signal U135 generated in sensor electrode 135, and which has the same frequency as the driving frequency of sensor element 130. In this case, cancellation signal output circuit 177 does not inject any cancellation signal to the point between sensor electrode 134 and processor 173. This can eliminate an adverse influence due to a shift in the phases of undesired signals U134 and U135 precisely when comparator unit 170 compares the signals output from integrator circuits 156 and 167. This structure reduces the size of the circuit since cancellation signal C3135 is injected only to the point between sensor electrode 135 and processor 173, while no cancellation signal is injected to the point between sensor electrode 134 and processor 173.

As discussed above, sensor electrode 134 is provided on vibration body 131 and adapted to generate undesired signal U134 and an electric charge responsive to an angular velocity applied to vibration body 131. Sensor electrode 135 is provided on vibration body 131 and is adapted to generate undesired signal U135 and an electric charge responsive to the angular velocity applied to vibration body 131. Driver circuit 140 vibrates vibration body 131 with a predetermined driving frequency. Processor 173 detects the signals output from sensor electrodes 134 and 135. Cancellation signal output circuit 177 is operable to inject cancellation signal C134 having a polarity opposite to undesired signal U134 and the same amount of electric charge as undesired signal U134 to the point between sensor electrode 134 and processor 173, and to inject cancellation signal C135 having a polarity opposite to undesired signal U135 and having the same amount of electric charge as undesired signal U135 to the point between sensor electrode 135 and processor 173.

Processor 173 includes D/A converters 148 and 166, integrator circuits 156 and 167, comparator unit 170, and D/A switching units 147 and 157. D/A converter 148 outputs at least two levels of electric charges of reference voltages V149 and V150. D/A converter 166 also outputs at least two levels of electric charges of reference voltages V160 and V161. Integrator circuit 156 integrates the electric charge generated in sensor electrode 134 and the electric charge output from D/A converter 148. Integrator circuit 167 integrates the electric charge generated in sensor electrode 135 and the electric charge output from D/A converter 166. Comparator unit 170 compares the output signal from integrator circuit 156 with the output signal from integrator circuit 167. D/A switching unit 147 switches the level of the output signal from D/A converter 148 according to a comparison result performed by comparator unit 170. D/A switching unit 159 switches the level of the output signal from D/A converter 166 according to the comparison result preformed by comparator unit 170.

Industrial Applicability

An angular velocity sensor according to the present invention has an advantage of improved reliability such that it does not continue to output any signal not corresponding to an angular velocity if any of circuit traces becomes disconnected around the sensor electrodes, and it is therefore useful especially as an angular velocity sensor provided with a digital circuit used for controlling attitude of a mobile body such as an aircraft, a vehicle, or a navigation system.

An angular velocity sensor according to the present invention has another advantage capable of positively removing an undesired signal generated due to imbalance in the mass of vibration body even though the vibration body is downsized with miniaturization of the angular velocity sensor, and it is therefore useful especially as the angular velocity sensor for controlling attitude of the mobile body such as an aircraft, a vehicle, or a navigation system.

REFERENCE MARKS IN THE DRAWINGS

31 Vibration Body
34 Sensor Electrode (First Sensor Electrode)
35 Sensor Electrode (Second Sensor Electrode)
40 Driver Circuit
43 Timing Control Circuit
47 D/A Switching Unit (First D/A Switching Unit)
48 D/A Converter (First D/A Converter)
56 Integrator Circuit (First Integrator Circuit)
59 D/A Switching Unit (Second D/A Switching Unit)
66 D/A Converter (Second D/A Converter)
67 Integrator Circuit (Second Integrator Circuit)
70 Comparator Unit
78 Disconnection Detecting Switch (First Disconnection Detecting Switch)
80 Disconnection Detecting Switch (Second Disconnection Detecting Switch)
131 Vibration Body
134 Sensor Electrode (First Sensor Electrode)
135 Sensor Electrode (Second Sensor Electrode)
147 D/A Switching Unit (First D/A Switching Unit)
148 D/A Converter (First D/A Converter)
156 Integrator Circuit (First Integrator Circuit)
159 D/A Switching Unit (Second D/A Switching Unit)
166 D/A Converter (Second D/A Converter)
167 Integrator Circuit (Second Integrator Circuit)
170 Comparator Unit
173 Processor
177 Cancellation Signal Output Circuit

The invention claimed is:

1. An angular velocity sensor comprising:
   a vibration body;
   a first sensor electrode provided on the vibration body for generating an electric signal responsive to an angular velocity applied to the vibration body, the first sensor electrode further generating a first undesired signal;
   a second sensor electrode provided on the vibration body for generating an electric signal responsive to the angular velocity, the second sensor electrode further generating a second undesired signal;
   a driver circuit for vibrating the vibration body at a predetermined driving frequency;
   a processor having an integrator circuit for detecting a signal output from the first sensor electrode; and
   a cancellation signal output circuit operable to inject a cancellation signal into a point between the first sensor electrode and the processor, the cancellation signal having an amount of an electric signal identical to an amount of a difference between the first undesired signal and the second undesired signal and having a polarity opposite to a polarity of the difference between the first undesired signal and the second undesired signal,
   wherein the first undesired signal has a phase delayed by 90 degrees from an output signal generated in the first sensor electrode, and
   the second undesired signal has a phase delayed by 90 degrees from an output signal generated in the second sensor electrode, and
   wherein the integrator circuit has a time constant which causes the phase delay of 90 degrees of the corresponding first undesired signal to have a further phase shift based on the time constant.

2. The angular velocity sensor of claim 1, wherein the cancellation signal output circuit includes a D/A converter circuit for outputting a sinusoidal wave signal having a frequency identical to the driving frequency of the vibration body.

3. The angular velocity sensor of claim 1, wherein the cancellation signal output circuit includes a D/A converter circuit for outputting a rectangular wave signal having a frequency identical to the driving frequency of the vibration body.

4. The angular velocity sensor of claim 3, wherein the cancellation signal output circuit controls a sum of an electric charge output from the cancellation signal by adjusting the rectangular wave in a time-axis direction.

5. The angular velocity sensor of claim 1, wherein the processor includes
   a first D/A converter for outputting at least two levels of an electric charge,
   a second D/A converter for outputting at least two levels of an electric charge,
   a first integrator circuit for integrating the electric signal generated in the first sensor electrode and the electric charge output from the first D/A converter,
   a second integrator circuit for integrating the electric signal generated in the second sensor electrode and the electric charge output from the second D/A converter,
   a comparator unit for comparing an output signal from the first integrator circuit with an output signal from the second integrator circuit,
   a first D/A switching unit for switching a level of the output signal from the first D/A converter according to a comparison result of the comparator unit, and
   a second D/A switching unit for switching a level of the output signal from the second D/A converter according to the comparison result of the comparator unit.

* * * * *